United States Patent [19]

Heck et al.

[11] Patent Number: 4,694,974

[45] Date of Patent: Sep. 22, 1987

[54] ESCAPEMENT APPARATUS FOR AN AUTOMATIC SCREW FEEDING MACHINE

[76] Inventors: Michael Heck, 302 NE. 36th St., Boca Raton, Fla. 33432; Nathan Singer, 5710 NW. 54th Way, Tamarac, Fla. 33319

[21] Appl. No.: 744,629

[22] Filed: Jun. 14, 1985

[51] Int. Cl.[4] .............................................. B65G 59/06
[52] U.S. Cl. ................................... 221/263; 221/278; 227/118; 81/430
[58] Field of Search ...................... 221/231, 233-235, 221/239, 263-266, 268, 277-278; 227/117, 118, 116; 81/430, 435, 57.37

[56] References Cited

U.S. PATENT DOCUMENTS

| | | | |
|---|---|---|---|
| 1,825,210 | 9/1931 | Seely | 221/277 X |
| 2,706,504 | 4/1955 | Moore | 81/430 |
| 2,820,494 | 1/1958 | Haberstump | 144/32 |
| 2,922,447 | 1/1960 | Moore | 144/32 |
| 3,170,627 | 2/1965 | Pearson et al. | 221/277 X |
| 3,297,199 | 1/1967 | Law | 221/263 X |
| 3,581,967 | 6/1971 | Benson | 227/112 |
| 3,875,982 | 4/1975 | Mizu et al. | 144/32 |
| 3,930,808 | 1/1976 | Miller et al. | 29/200 |
| 4,222,495 | 9/1980 | Kaneko | 221/278 X |
| 4,278,184 | 7/1981 | Willis | 221/233 |
| 4,363,573 | 12/1982 | Ginther et al. | 221/278 X |

FOREIGN PATENT DOCUMENTS 602526 7/1960 Canada .
1503072 10/1969 Fed. Rep. of Germany .

OTHER PUBLICATIONS

Tru-Tork Brochure, Clyde Eng. & Mfg. Corp.; 11-2-1959.
Pneuma-Serve Brochure, Pneuma Serve, Inc.; 9-1-3-1955.

Primary Examiner—Charles A. Marmor
Attorney, Agent, or Firm—Richard M. Saccocio

[57] ABSTRACT

An escapement mechanism for an automatic screw feeding machine is disclosed. A rotor within a housing receives a fastener from a track feed arrangement and delivers the fastener to a delivery opening in communication with a conduit leading to the driver head of the automatic screw feeding machine. A cutout within the rotor is specially sized and positioned and the motion of the rotor is arranged so that no edges are presented which may cause the fastener to hang up or cause jamming of the escapement apparatus. A reed valve is used to open and close the delivery opening so that pneumatic apparatus may be used to drive the fastener to the driver head.

8 Claims, 6 Drawing Figures

ESCAPEMENT APPARATUS FOR AN AUTOMATIC SCREW FEEDING MACHINE

CROSS REFERENCE TO RELATED APPLICATIONS

This application is related to co-pending patent applications entitled "Track Feed Arrangement for an Automatic Screw Feeding Machine" and "Driver Jaws for an Automatic Screw Feeding Machine," by Michael Heck and Nathan Singer.

BACKGROUND OF THE INVENTION

1. Field of the Invention

This invention relates in general to the field of automatic screw feeding machines and in particular to the field of escapement arrangement whereby fasteners are received from a track feeding arrangement and are delivered to a driver head of an automatic screw feeding machine.

2. Description of the Prior Art

An automatic screw feeding machine is the terminology which is commonly applied to a machine which arranges fasteners, such as screws, from a bulk, loose form into an arrangement whereby the fasteners are aligned and then individually delivered to a driver head. The driver head is then utilized to drive a single fastener within a pre-existing hole so as to fasten one component to another. The purpose of such machines is, of course, to speed up production by providing rapid fastening of two or more components. Since speed of production is the main objective of such machines, any portion of the machine which tends to jam or malfunction in any manner results in a work stoppage which is contrary to such main objective. Each operation performed upon a fastener which is being utilized within a machine, from its bulk supply disposition to its fastened disposition and at any point therebetween, must necessarily occur in a serial mode whereby one step follows the other. Any one step, therefore, if it is not accomplished properly, will cause a complete shutdown of the machine and production. In today's modern factories, any production shutdown due to a malfunctioning machine must be avoided at all reasonable costs.

Screws, or other similar fasteners, used in industry are generally mass produced. Mass production involves greater tolerances for a given characteristic of the fasteners such as the head height, head diameter, or shank diameter, as compared to corresponding individualized custom machining of such fasteners. Automatic screw feeding machines must accommodate such mass-produced fasteners. The greater tolerances of the mass produced fasteners thereby imposes relatively difficult, individualized tasks on automatic screw feeding machines.

One area where automatic screw feeding machines of the prior art experiences difficulty is in receiving the fasteners from a track arrangement and subsequently delivering a single fastener in the proper orientation to a port or duct where the fastener is then pneumatically driven to the driver head of an automatic screw feeding machine. Escapament mechanisms of the prior art are known such that a slide receives a fastener and moves the fastener laterally to a position over a flexible conduit. The slide may be actuated by a solenoid or an air cylinder. When the fastener is moved to the position over the flexible conduit, it may drop by a combination of gravity and vacuum from a fluid pressure source introduced downstream of the outlet from where the fasteners are directed to the escapement mechanism or the driver head mechanism.

While such escapement mechanism are known in the prior art, there exists a need to improve upon the operation of such apparatus. The geometric configuration of screw fasteners does not readily lend itself to the operations inherent in such escapement or delivery systems. Because the head of a fastener is larger than the shank diameter of the fastener, it is difficult for automatic apparatus to grasp some portion of the fastener and mechically move it along a route of travel to a delivery point downstream of the pickup point. During the travel of the fastener and while being retained by the grasping and moving mechanism, it is required that the fastener maintain a substantially precise, predetermined orientation. The differences in diameter between the shank and head of the screw serves to make such operation very difficult. And, since continuous nonjamming operation is a major objective of such apparatus, satisfactory prior art apparatus is not available.

Accordingly, new, different, and improved escapement apparatus is desired, which decreases the tendency for mass-produced fasteners to become misoriented and thereby jam while being removed from an appropriate track feeding arrangement and delivered to a port whereby fasteners may be pneumatically ducted to the driver head of an automatic screw feeding machine.

It is to be noted and especially recognized that there are other objects of the present invention which although not specifically stated but which objects will be obvious to those skilled in the art to which this invention pertains, are intended to be included within the scope of the present invention.

SUMMARY OF THE INVENTION

The present invention accomplishes the above-stated objects, in addition to others, by providing jam-stated resistant escapement apparatus for fasteners for an automatic screw feeding machine.

Appropriate fasteners, such as screws, may be delivered to the inventive apparatus by a gravity-assisted track arrangement. A rotor having a semicircular cutout in the periphery thereof receives the lead fastener from the aforementioned track feed arrangement. The cutout in the rotor is sized such and positioned such whereby the lead fastener, assisted by gravity, enters the cutout and moves downward and away from the opening within the end of the track apparatus. The rotor is then caused to rotate approximately 90°. During the initial stage of rotation, the fasteners' location prevents it from being interfered with by either of the edges of the tracks and thereby eliminates the possibility of being jammed by these edges. At the end stage of the rotational travel, the cam action of a cutout in a plate above the rotor, causes the fastener to move in a radial direction so as to permit the head of the fastener to clear its seating surface on the rotor. At this point, the cutout in the rotor is aligned with another semicircular cutout in the housing surrounding the rotor such that a cylindrical opening is formed. The end of the cammed cutout in the plate above the rotor, and the alignment of the two semicircular cutouts form an edge-free opening which allows the fastener to drop through the opening without jamming. A valve at the bottom of the opening opens at the end stage of rotation and allows the fastener to be directed into a pneumatic tube which ultimately delivers the fastener to the driver head of an automatic screw feeding machine. Jam-free travel, as well as jam-free delivery, of an individual fastener is thereby effectuated.

Various other objects, advantages, and features of the invention will become apparent to those skilled in the art from the following discussion taken in conjunction with the following drawings, in which:

DESCRIPTION OF THE PREFERRED EMBODIMENTS

Figure 1A:
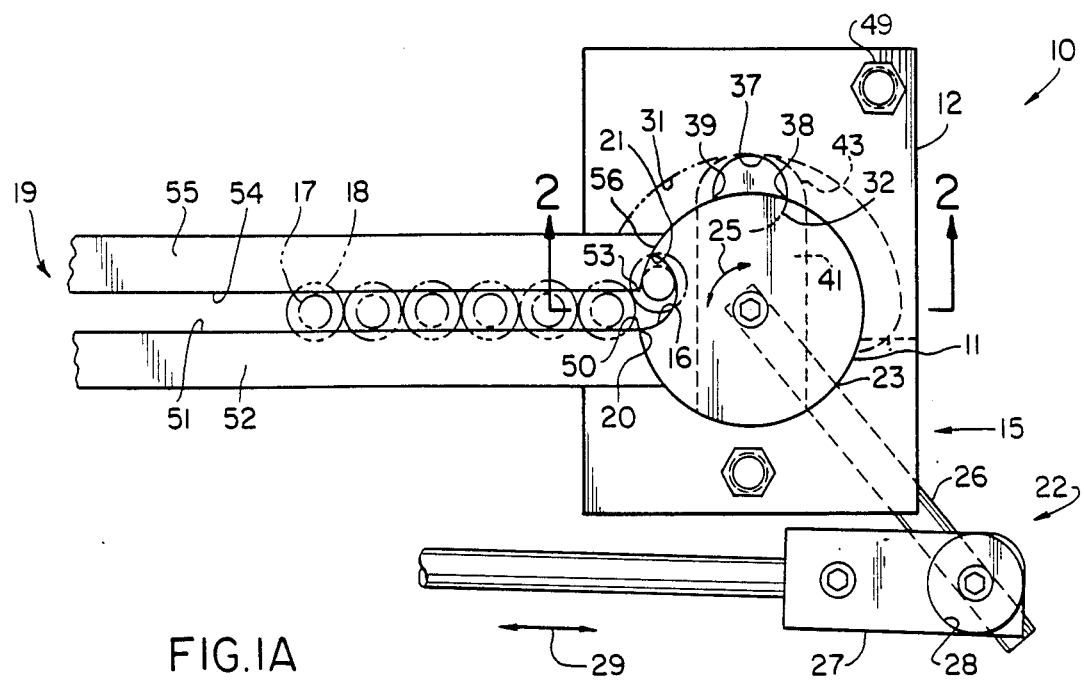
FIGS. 1A and 1B are views taken along the line 1—1 of FIG. 2 of the inventive escapement apparatus, illustrating a preferred embodiment thereof; and, illustrating the sequence of operation thereof.

Reference is now made to the drawings where like characteristics and features of the various figures are denoted by like reference characters.

The inventive escapement apparatus 10 comprises a rotor 11 having a substantially cylindrical configuration, a rotor housing 12 within which rotor 11 is fitted, an upper plate 13, a lower plate assembly 14, a valve assembly 15, and rotating means 22 for moving the rotor in a rotational manner, all of which are connected together by fasteners 49.

Rotor 11 comprises a cylindrical member containing a substantially semicircular cutout 16 at the periphery thereof and oriented with its axis parallel to the axis of rotor 11. The radius of cutout 16 is slightly larger than the diameter of shank 17 of a fastener 18. The position of cutout 16 shown in FIG. 1A, comprises the receiving position of rotor 11. By receiving position, it is meant that the rotor 11 of the escapement apparatus 10 is positioned to receive a fastener 18 from the line of fasteners positioned within an appropriate track arrangement 19 which operationally abuts the inventive escapement apparatus 10. As is clearly shown in FIG. 1 of the drawings, the near edge 20 of cutout 16 is aligned with the edge 50 of inside surface 51 of near track 52 of arrangement 19. Since the diameter of cutout 16 is approximately twice the diameter of the shank 17 of fasteners 18, the remote edge 21 of cutout 16 is spaced away from the edge 50 and inside surface 51 of track 52 by a distance approximately equivalent to twice the diameter of shank 17 of fasteners 18. At this point, it is to be noted that the track arrangement 19, as well as the inventive escapement apparatus 10, is oriented at an angle 24 of approximately 15° with the horizontal. Such angle is consistent with a typical gravity-assisted feed arrangement of an appropriate track arrangement 19 of an automatic screw feeding machine.

Angle 24 of escapement apparatus 10, in conjunction with the size and location of cutout 16, allow the lead fastener 18 to exit from a track arrangement 19 and into cutout 16. Upon entering cutout 16, lead fastener 18 is caused to move away from edge 20 and toward edge 21 of cutout 16 coming to rest at the approximate center of the periphery of cutout 16. In this manner, the axial centerline of fastener 18 is slightly downstream (in a clockwise direction) of the inside edge 53 created by inside surface 54 of remote track 55 of arrangement 19. Additionally, a slight amount of clearance exists between the periphery of shank 17 of fastener 18 and the edge 53 and end surface 56 of track 55. Such orientation and clearance is important to the initial operational aspects of the inventive escape apparatus 10, because no edge which can cause jamming is presented.

Rotor 11 rotates within rotor housing 12 in the directions shown by arrows 25 which comprises approximately 90° of rotation in either direction 25. The rotational movement of rotor 11 is effectuated by rotating means 22. Rotating means 22 may comprise a lever arm 26 which is appropriately connected to rotor 11 and clevis 27. One end of lever 26 may be positioned within a hole 23 in the side of rotor 11. A rotatable cylinder 28 may be fitted to clevis 27 such that the other end of lever arm 26 fits within an opening in cylinder 28. Lever arm 26 is free to slide within the opening in cylinder 28 such that when motion is imparted to clevis 27, in the direction indicated by arrows 29, nonbinding movement between the parts is effectuated. The motion of clevis 29 may be imparted by an appropriate air cylinder or any other such satisfactory well-known means.

Figure 1B:
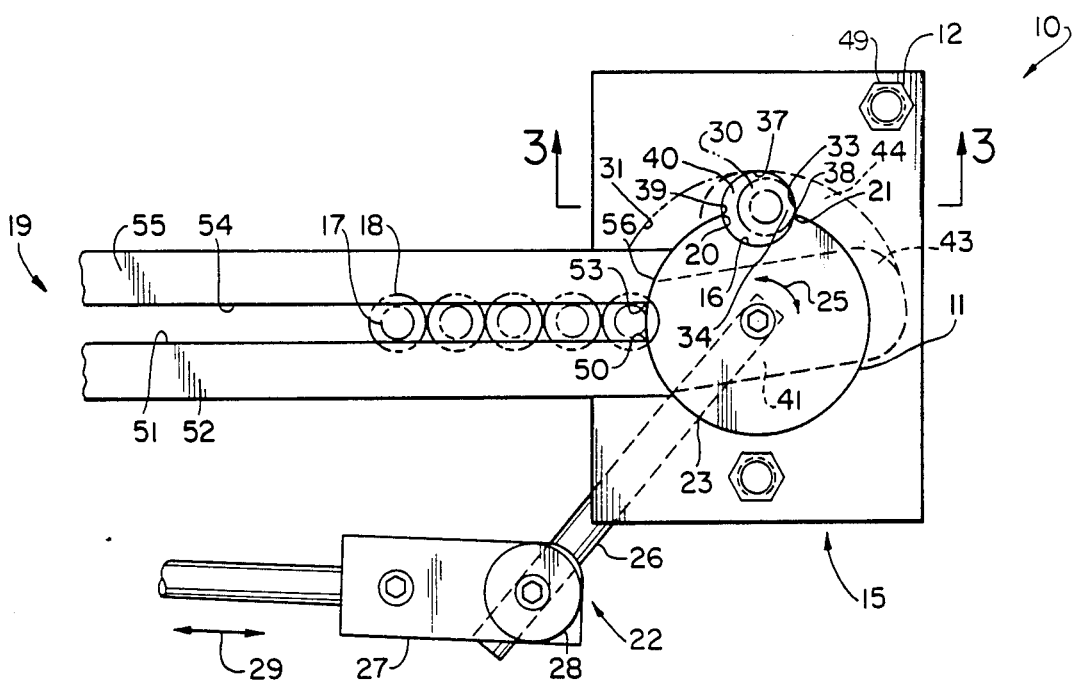
Figure 2:
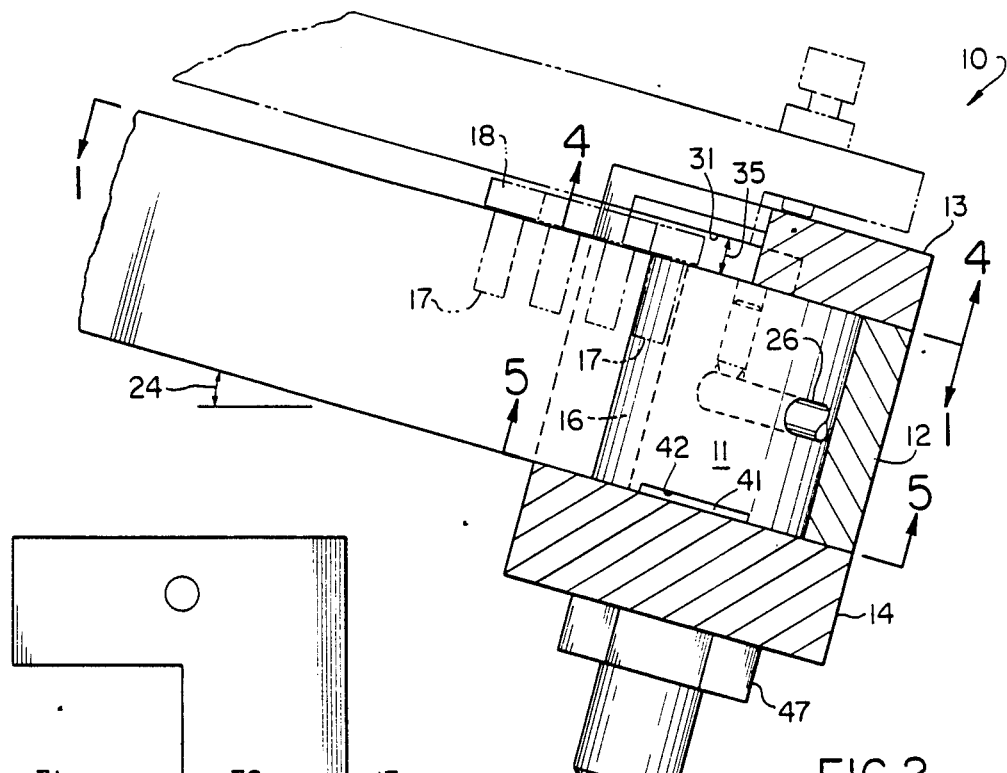
FIG. 2 is a side elevational view, partially in cross section, taken along the line 2—2 of the escapement apparatus of FIG. 1A.
Figure 4:
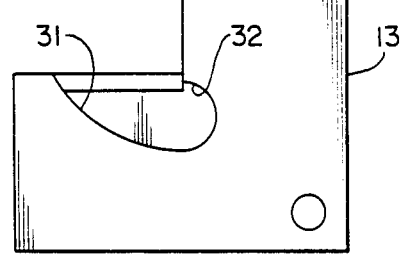
FIG. 4 is a plan view of the underside of the top plate of the escapement mechanism, taken along the line 4—4 of FIG. 2, illustrating the configuration of the cammed cutout therein; and, FIG. 5 is a plan view of the underside of the rotor and housing, taken along the line 5—5 of FIG. 2, illustrating the valve mechanism in conjunction with the openings in the rotor and housing.
Figure 5:
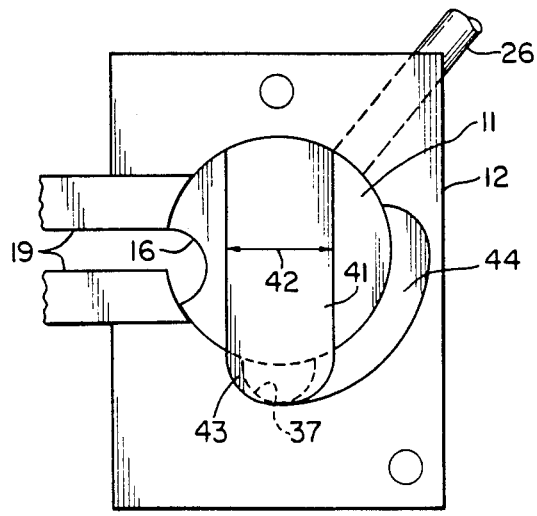

By imparting rotary motion to rotor 11, by rotating means 22, cutout 16 and fastener 18, contained therein, begins to move from point A to point B, as shown in FIG. 1. During this period of time, the head 30 of fastener 18, which is indicated by the dashed or phantom lines shown in FIG. 1, is resting upon the upper surface of rotor 11. A cammed cutout 31 in the underside of upper plate 13, in combination with the contact of head 30 with the upper surface of rotor 11, serve to maintain the perpendicular and axial alignment of fastener 18 relative to rotor 11 and especially cutout 16 thereof. The depth 35 of cammed cutout 31 is, therefore, slightly larger than the height of the head 30 of fastener 18. Continued rotation of rotor 11 positions the fastener 18 to that location indicated by the designation B in FIG. 1.

Figure 3:
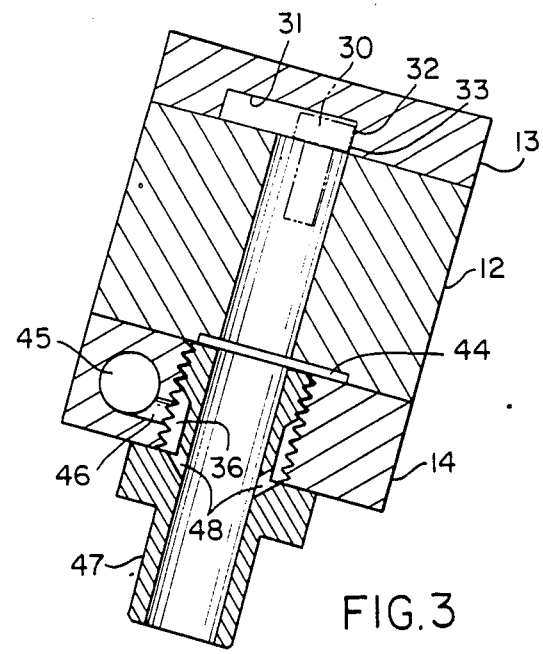
FIG. 3 is a cross-sectional view of a portion of the escapement apparatus of FIG. 1B, taken along the line 3—3 thereof.

Location B comprises the exit location of a fastener 18 from escapement apparatus 10. Details of the exit location B are also shown in FIG. 3 of the drawings. Another semicircular cutout 37 is provided within rotor housing 12 at location B. Cutout 37 has the same dimensions as cutout 16, such that when edges 21 and 20 are aligned respectively with remote edge 38 and near edge 39, such that a completely circular opening 40 thereby results. It is to be expressly noted that at the drop point, i.e., position B, cutout 16 disappears by merging within cutout 37 in creating through opening 40 and all aspects of a travel path of the fastener to the drop hole have disappeared. Thus, at drop point B, all that exists is a through hole 40. There are no other geometric features or shapes which might cause jamming.

Valve assembly 15 comprises a reed 41, which fits within a cutout 42 in the bottom surface of rotor 11. An end portion 43 of reed valve 41 covers cutout 37 in housing 12 when rotor 11 is at position A. A clearance cutout 44 in the bottom of housing 12 provides clearance space for end portion 43 when rotor 11 rotates. Since valve 41 moves with rotor 11, the opening and closing of cutout 37 is, therefore, consistent with the receiving and delivery of a fastener 18 from escapement apparatus 10.

The cammed cutout 31 in upper plate 13 provides an important function in the positioning of a fastener 18 in order to effectuate its delivery to opening 40 and thereafter to the driver head of the automatic screw machine. Cammed cutout 31 includes a portion 32, which functions to move fastener 18 from its position within opening 16 to a position substantially centralized within the lower portion of the combined opening 40 created by cutouts 16 and 37. The force of such cam action, in combination with the gravity assist due to angle 24, causes the lower portion 33, of approximately 180°, of the head 30 of fastener 18 to come into contact with the lower portion 34, of approximately 180°, of the combined opening 40. In this manner, and because edges 21 and 38 are aligned, fastener 18 is exactly and precisely oriented relative to opening 40 such that no edges are allowed or exist which may cause jamming and, consequently, jam-free escapement may hereafter occur.

Since fastener 18 is dropped within opening 40 when valve 41 is in the open position, fastener 18 is then able to be ducted within the conduit (not shown) which may be attached to fitting 47 and then to the driver head of the automatic screw feeding machine. Such ducting occurs when valve 41 closes (rotor returns to position A) and a pneumatic gas pressure is introduced through openings 45, 46, and 48, and plenum 36, as shown in FIG. 3. Such pressurized ducting is well known.

Although not specifically shown, it is to be appreciated that inventive escapement apparatus 10 is connected to the base or other appropriate portion of an automatic screw feeding machine in any appropriate well-known manner, and such that the abutment of track arrangement 19 and the inventive escapement apparatus is maintained. Further, the various components of the inventive apparatus 10, i.e., the housing 12 and the lower 14 and upper plates, may be held together by use of appropriate fasteners within thread holes 49.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

We claim as our invention:

1. Escapement apparatus for an automatic screw feeding machine adapted to receive a fastener from a track feed arrangement with the shank of said fastener being positioned within the space between tracks and to deliver said fastener to a conduit which transmits said fastener to a driver of an automatic screw feeding machine, comprising a housing having a first opening therein, means fitting within said first opening for receiving a fastener from said track arrangement comprising a rotor having a cutout axially oriented along the periphery of said rotor, said cutout being adapted to receive the shank of said fastener therein, with the head of said fastener resting on the upper surface of said rotor, the axis of said rotor being positioned at an angle to the vertical, and said cutout for receiving the shank of said fastener having a substantially semi-cylindrical shape with a near axial edge thereof co-extensively positioned and abutting with the inside edge of one track of said track arrangement, said inside edge being the edge perpendicular to the longitudinal axis of the track and at the end face thereof, whereby a fastener received within said cutout is caused to be urged downstream of the edge at the inside surface and the end face of the other track, means connected to said means within said first opening for delivering said fastener to a drop point comprising a substantially cylindrical opening which is substantially free of obstructions, said cylindrical opening being adapted to be connected to conduit means whereby said fastener is ducted to the driver apparatus of said screw feeding machine.

2. The apparatus of claim 1, wherein said cylindrical opening comprises a combination of said cutout in said rotor and a second opening in said housing, said cutout and said second opening each comprising substantially one half of said cylindrical opening, whereby the path of travel of the fastener is merged within said obstruction-free drop point.

3. The apparatus of claim 1, wherein a clearance space exists between said edge at the inside surface and the end face of the other track and said shank of the fastener.

4. The apparatus of claim 1, wherein said means for delivery of said fastener to a drop point comprises drive apparatus connected to said rotor whereby the cutout in said rotor is movable from its position for receiving a fastener to a position at said drop point.

5. The apparatus of claim 4, wherein said drive apparatus comprises a lever attached to said rotor, and a pneumatic cylinder and piston attached to said lever, whereby said rotor is rotated within said housing from its receiving position to its delivery position in accordance with a demand signal initiated by said automatic screw feeding machine.

6. The apparatus of claim 1, wherein said escapement apparatus further comprises valve means for opening and closing the outlet of said cylindrical opening, said valve means being interposed between said cylindrical opening and said conduit means.

7. The apparatus of claim 6, wherein said valve means comprises a reed valve positioned within a slot in the bottom surface of said rotor with a portion of said reed valve extending over said outlet of the cylindrical opening, said reed valve moving in accordance with the movement of said rotor.

8. The apparatus of claim 1, wherein said housing includes a cover plate having a cam surface provided therein, said cam surface being in contact with the head of said fastener during delivery of said fastener to said cylindrical opening whereby said fastener is urged within said cylindrical opening.

* * * * *